Figure 1:
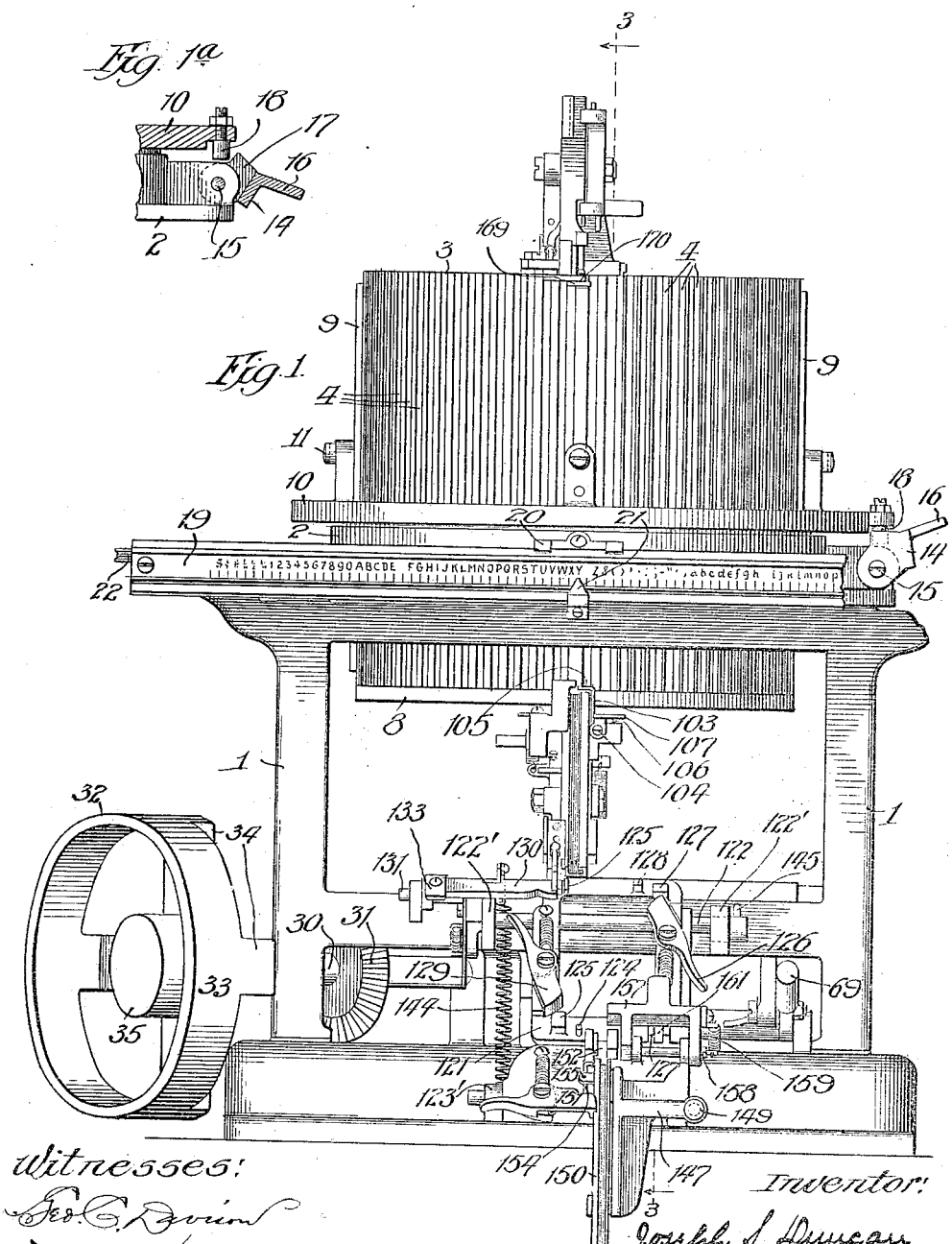

J. S. DUNCAN.
TYPE SETTING AND DISTRIBUTING MACHINE.
APPLICATION FILED JAN. 16, 1911.

1,195,189.

Patented Aug. 22, 1916.
10 SHEETS—SHEET 1.

J. S. DUNCAN.
TYPE SETTING AND DISTRIBUTING MACHINE.
APPLICATION FILED JAN. 16, 1911.

1,195,189.

Patented Aug. 22, 1916.
10 SHEETS—SHEET 4.

Witnesses:
Geo. C. Irwin
M. A. Kiddie

Inventor:
Joseph S. Duncan
By Linthicum, Belt & Fuller
Attys.

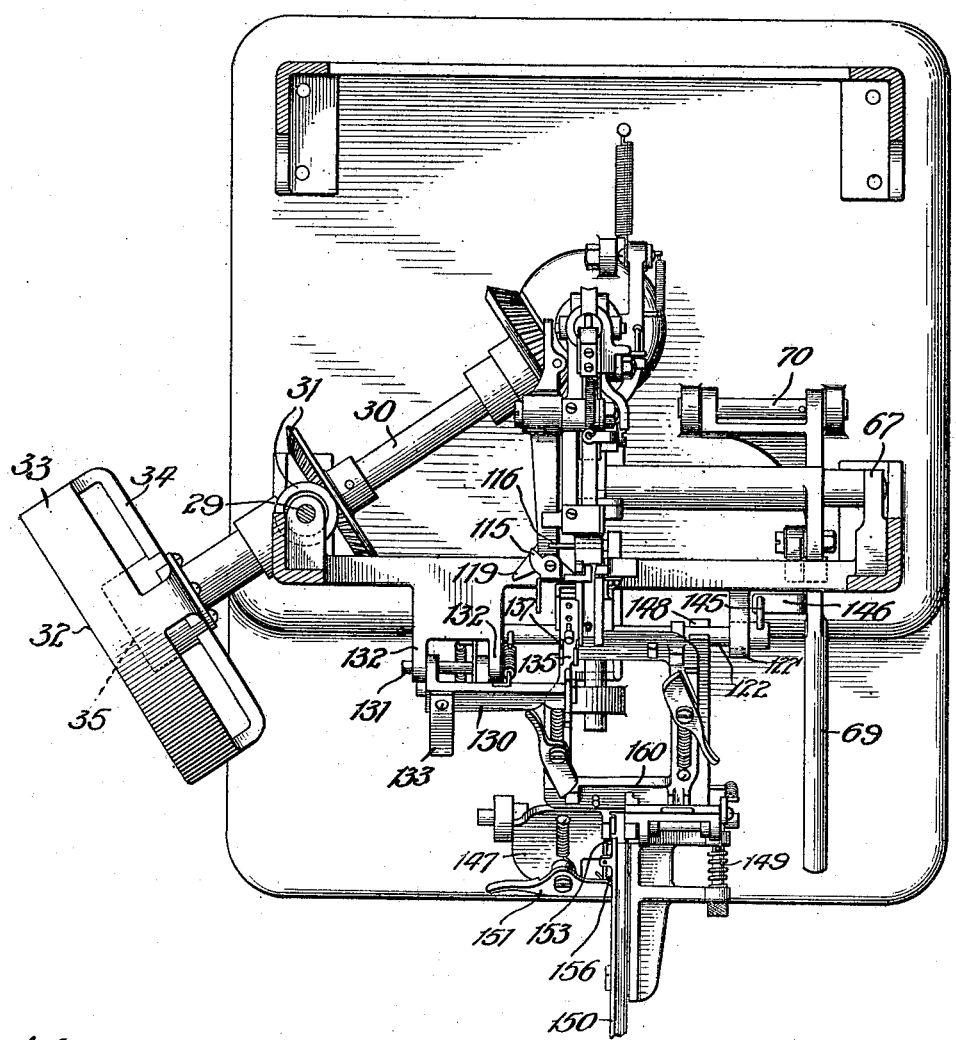

J. S. DUNCAN.
TYPE SETTING AND DISTRIBUTING MACHINE.
APPLICATION FILED JAN. 16, 1911.
1,195,189.
Patented Aug. 22, 1916.
10 SHEETS—SHEET 6.
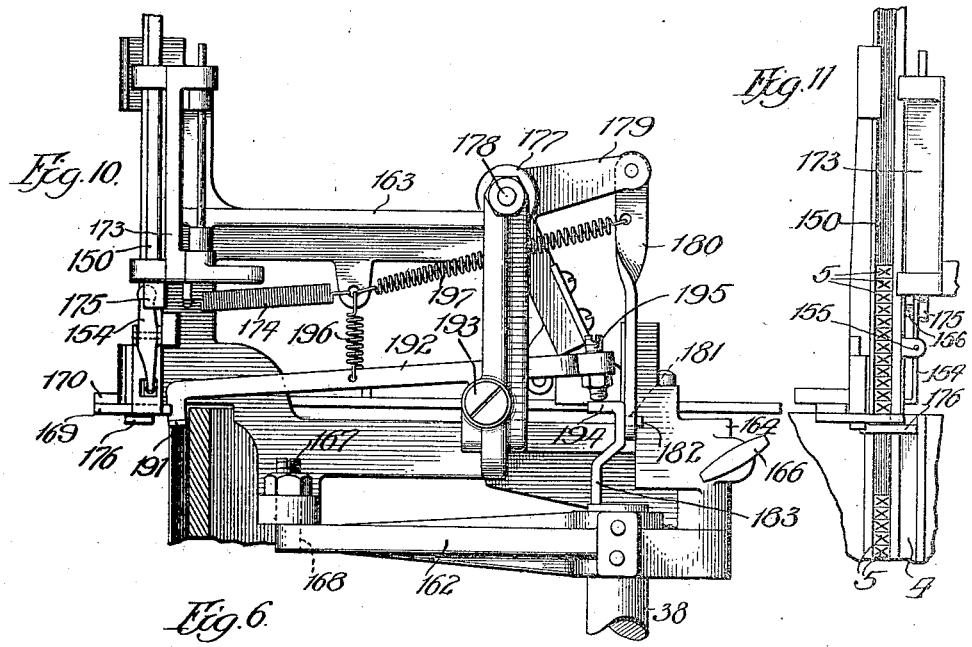
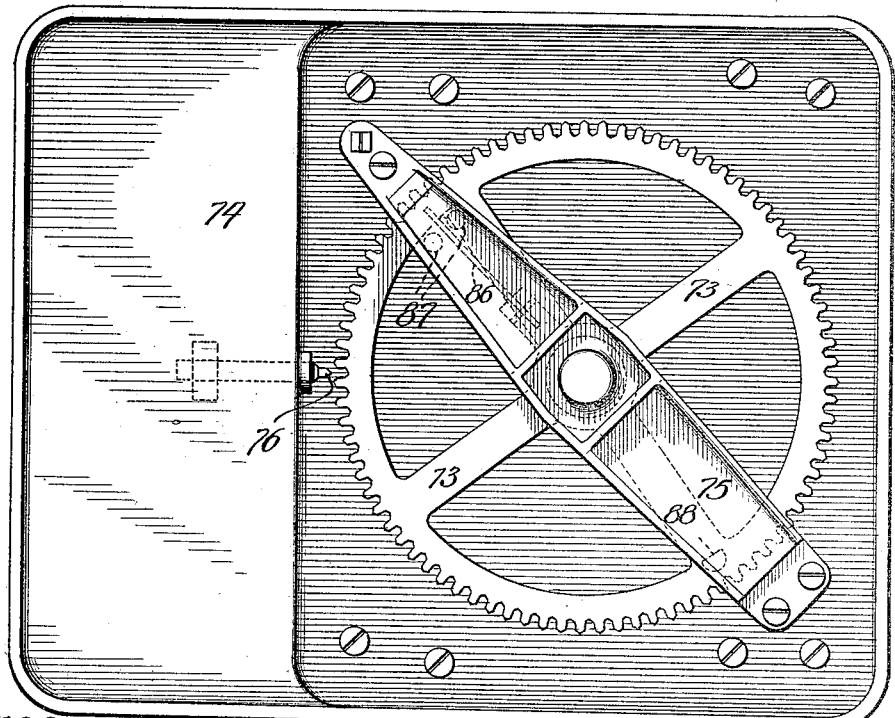

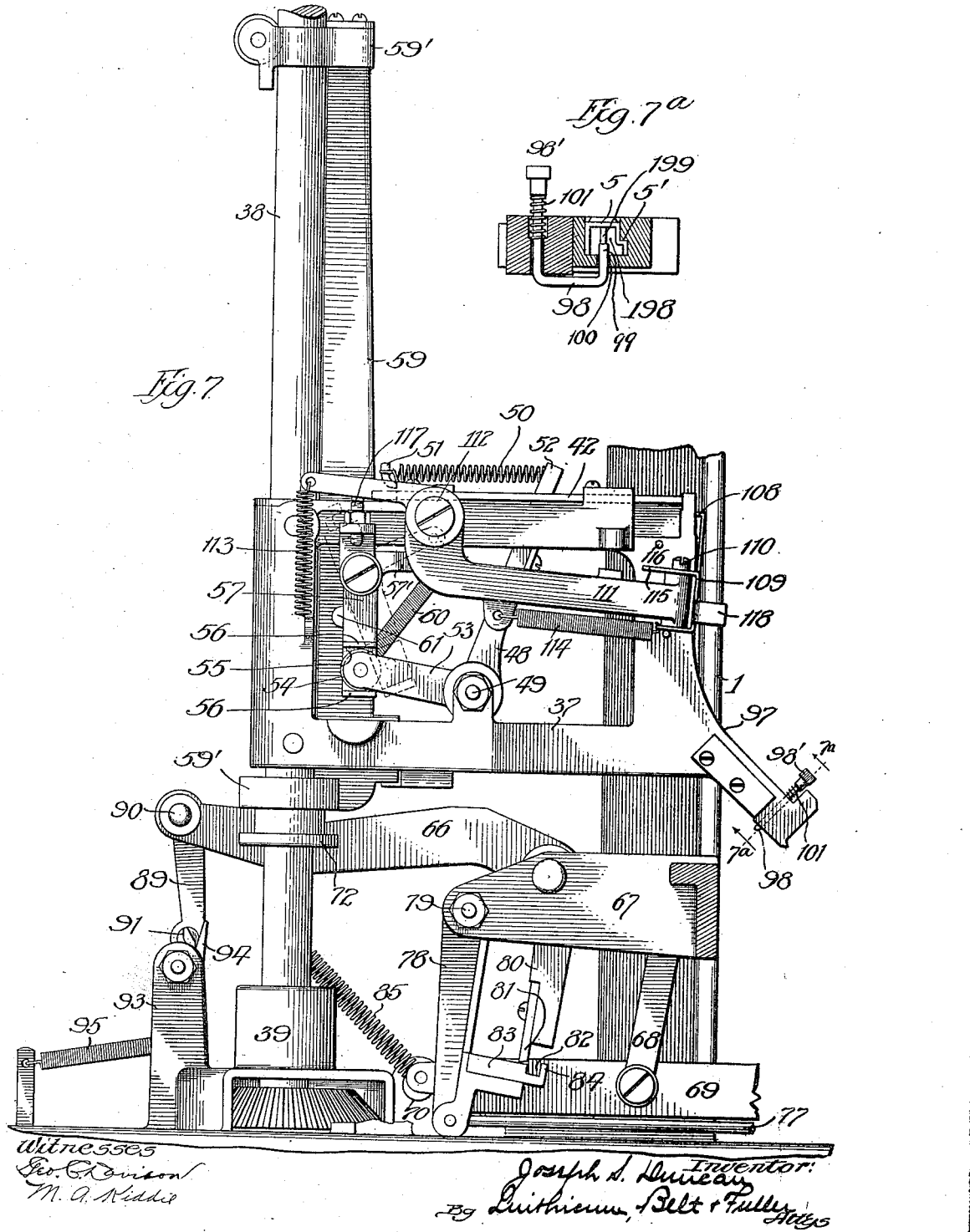

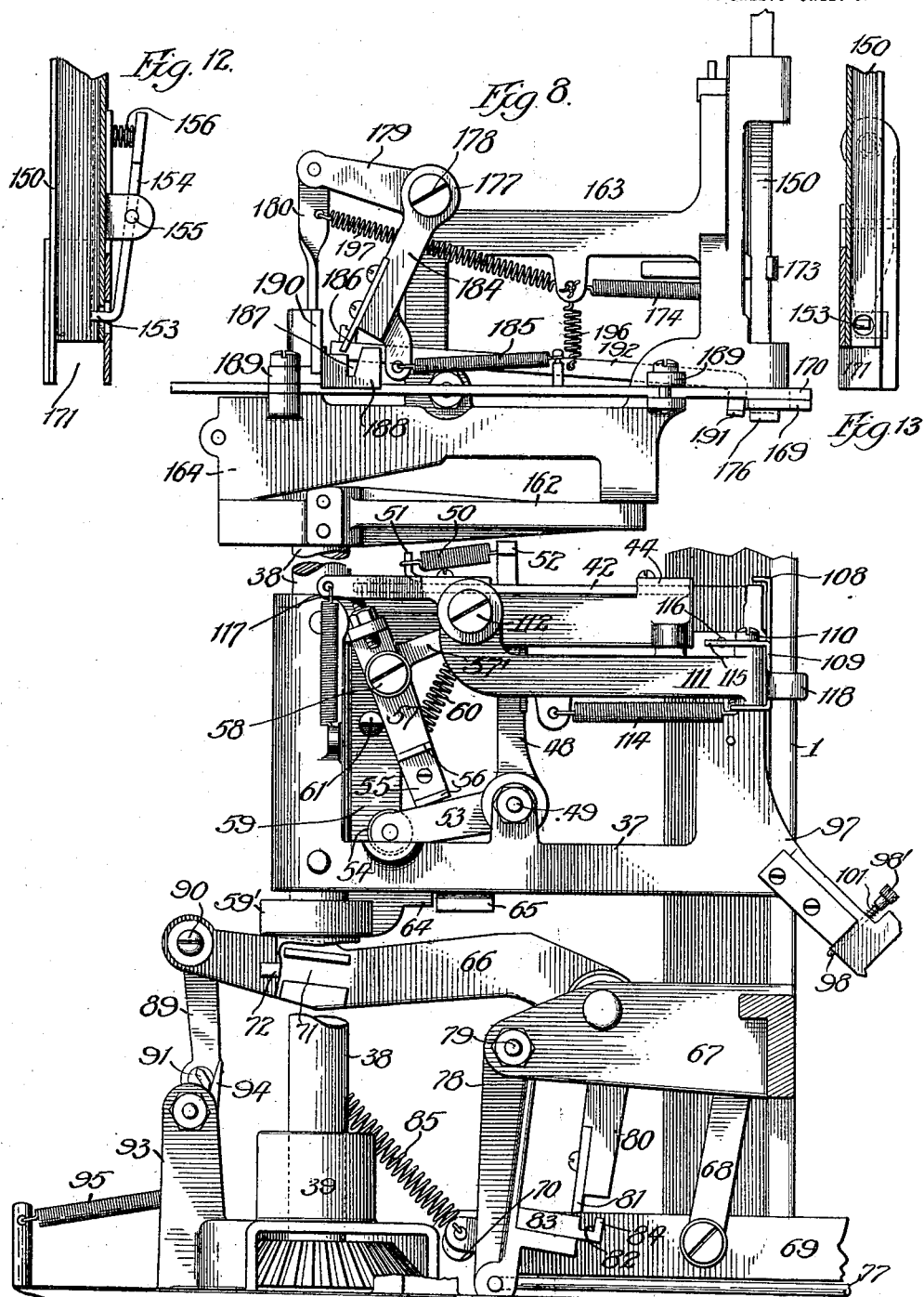

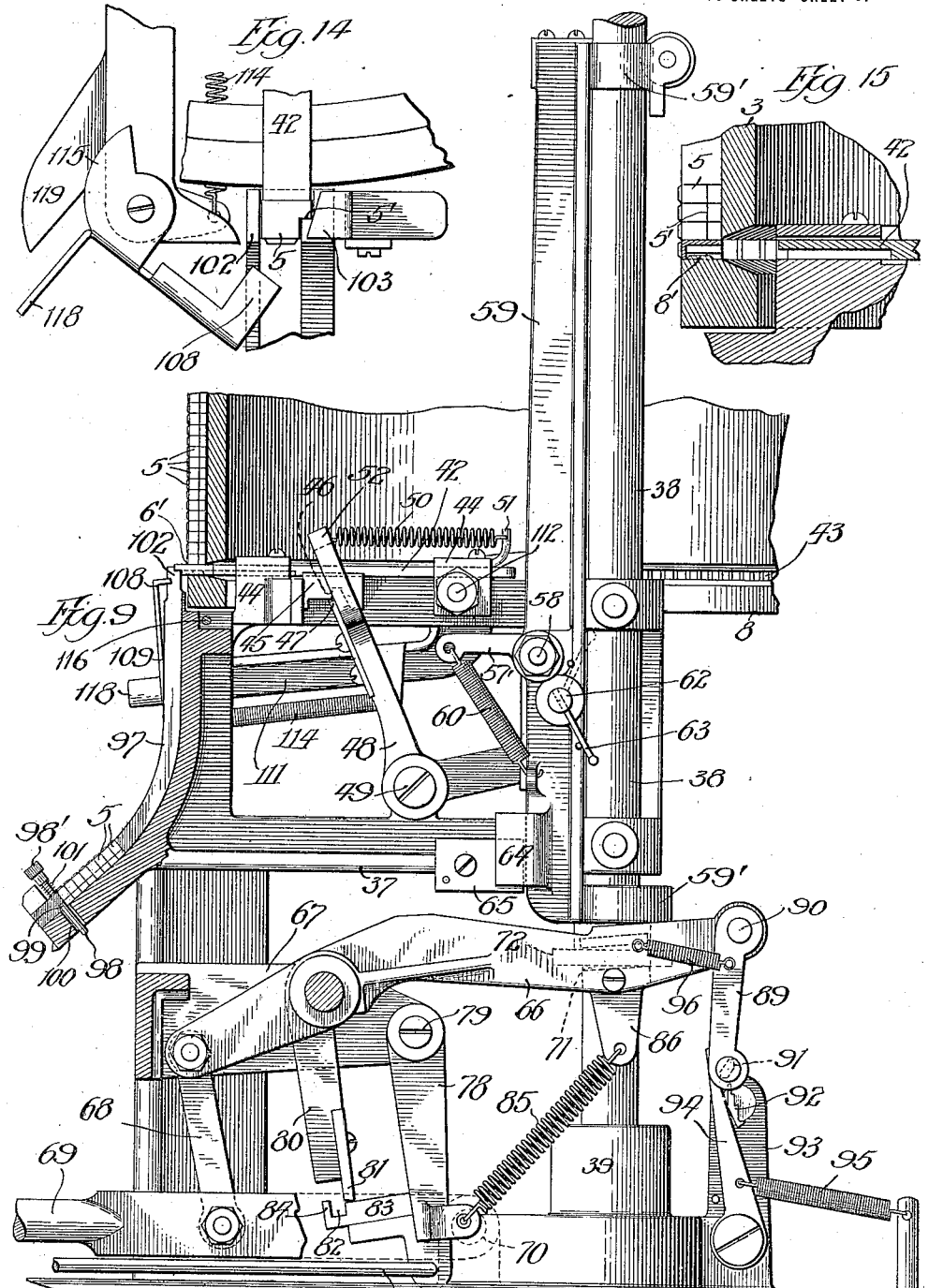

J. S. DUNCAN.
TYPE SETTING AND DISTRIBUTING MACHINE.
APPLICATION FILED JAN. 16, 1911.
1,195,189.
Patented Aug. 22, 1916.
10 SHEETS—SHEET 10.
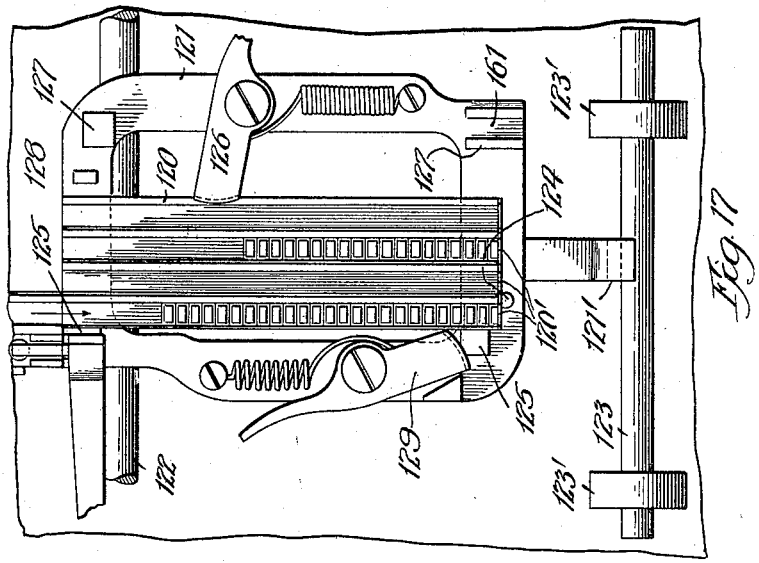
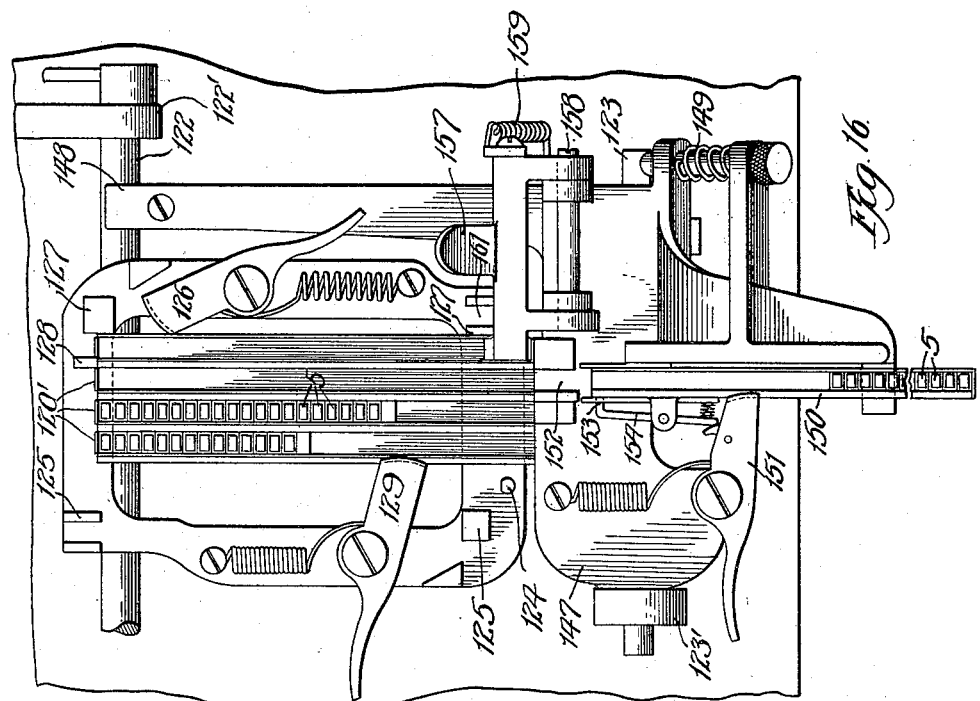

UNITED STATES PATENT OFFICE.

JOSEPH S. DUNCAN, OF CHICAGO, ILLINOIS, ASSIGNOR TO ADDRESSOGRAPH COMPANY, OF CHICAGO, ILLINOIS, A CORPORATION OF ILLINOIS.

TYPE SETTING AND DISTRIBUTING MACHINE.

1,195,189.   Specification of Letters Patent.   Patented Aug. 22, 1916.

Application filed January 16, 1911. Serial No. 602,831.

*To all whom it may concern:*

Be it known that I, JOSEPH S. DUNCAN, a citizen of the United States, residing at Chicago, in the county of Cook and State of Illinois, have invented new and useful Improvements in Type Setting and Distributing Machines, of which the following is a specification.

This invention relates to machines for setting and distributing type, and more particularly to that class of such machines which operate with loose type carried in a magazine and embody means adapted to be operated to set addresses or other matter in holders, which are run through printing machines of suitable character to take impressions therefrom, and other means whereby the forms contained in such holders may be distributed in the magazine.

The object of the invention is to provide a machine of comparatively simple construction for doing this work and adapted to be operated by persons not especially skilled whereby it is adapted for office use by owners and operators of addressing and similar machines.

Other objects of the invention are to provide a machine adapted for rapid operation; to construct and arrange the several groups of mechanism for the greatest convenience of the operator; to utilize the same parts, to a very material extent, for both setting and distributing type; to provide simple and easily operated means for converting the machine into a type setter or distributer; to automatically register the setting mechanism with the type holder in the magazine from which a type is to be removed and to lock the parts in this position while the type is being removed; to prevent a partial and insure a complete operation of the machine whenever the setter lever is operated; to enable a type to be easily removed from the setting channel or if it should get stuck or disarranged at the setting point; to provide a novel hand wheel for adjusting the setter mechanism to receive a type from any magazine holder; to support the type holder frame so that it will not interfere with the rotary movement of the setter mechanism and provide a simple and automatic adjustment for said frame to bring it close to the setter channel for the passage of type to the holder; to register the holder frame and setter mechanism, to lock the parts in registered position, to lock the register wheel when these parts are registered and to withdraw the type stop from the setter channel automatically; to provide novel means for easily adjusting and operating the transfer devices; to provide distributing mechanism of simple construction and operation; to guide the type so that it will be compelled to move radially forward out of the magazine and to prevent backward movement of the type into the magazine; to provide for a bodily forward movement of the type from the magazine into the setter channel and to temporarily sustain the type thus ejected at the top of the channel and then release and push it down in the channel.

Further objects will appear hereinafter in the detail description of the invention, as embodied in its preferred form in the accompanying drawings, in which—

Figure 2:
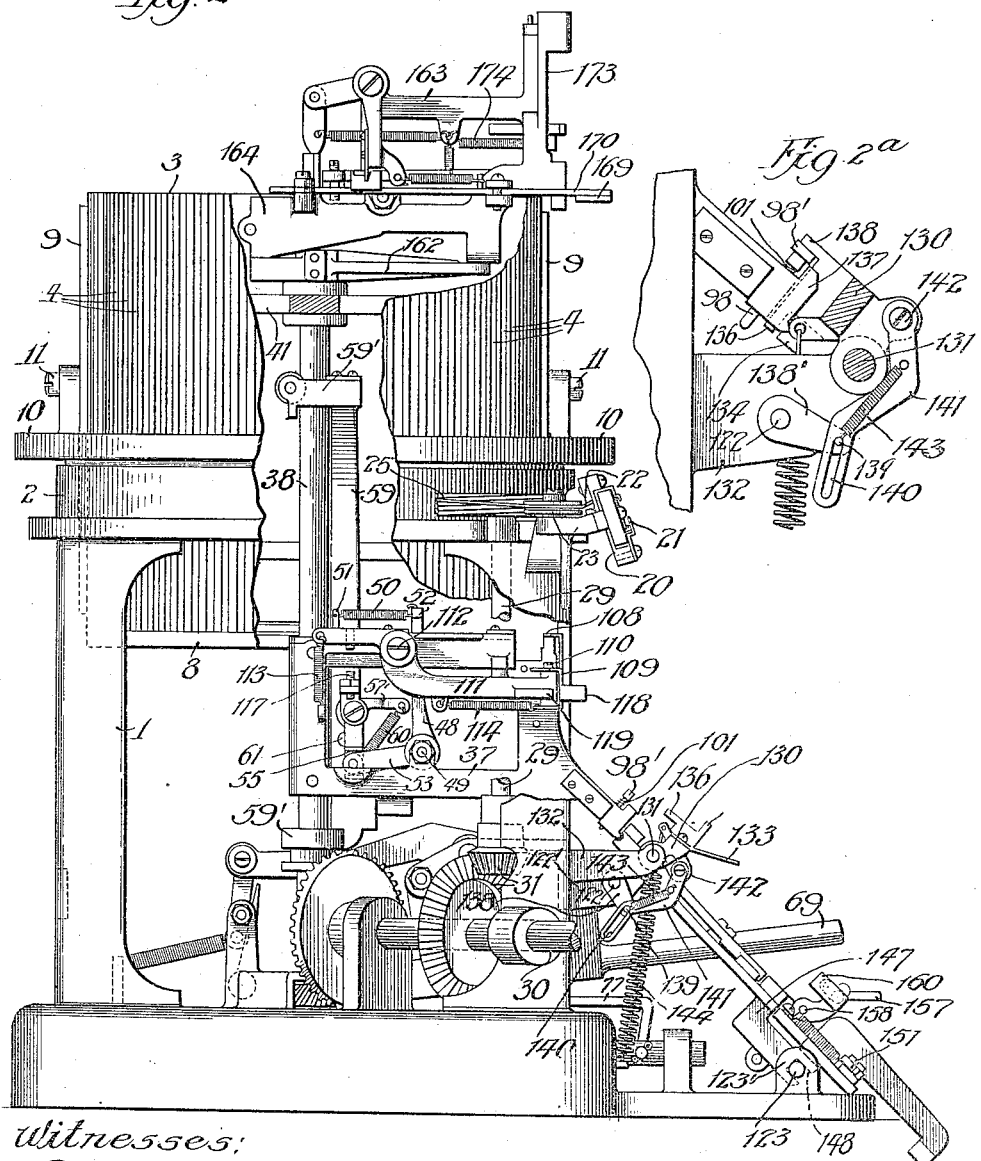
Figure 3:
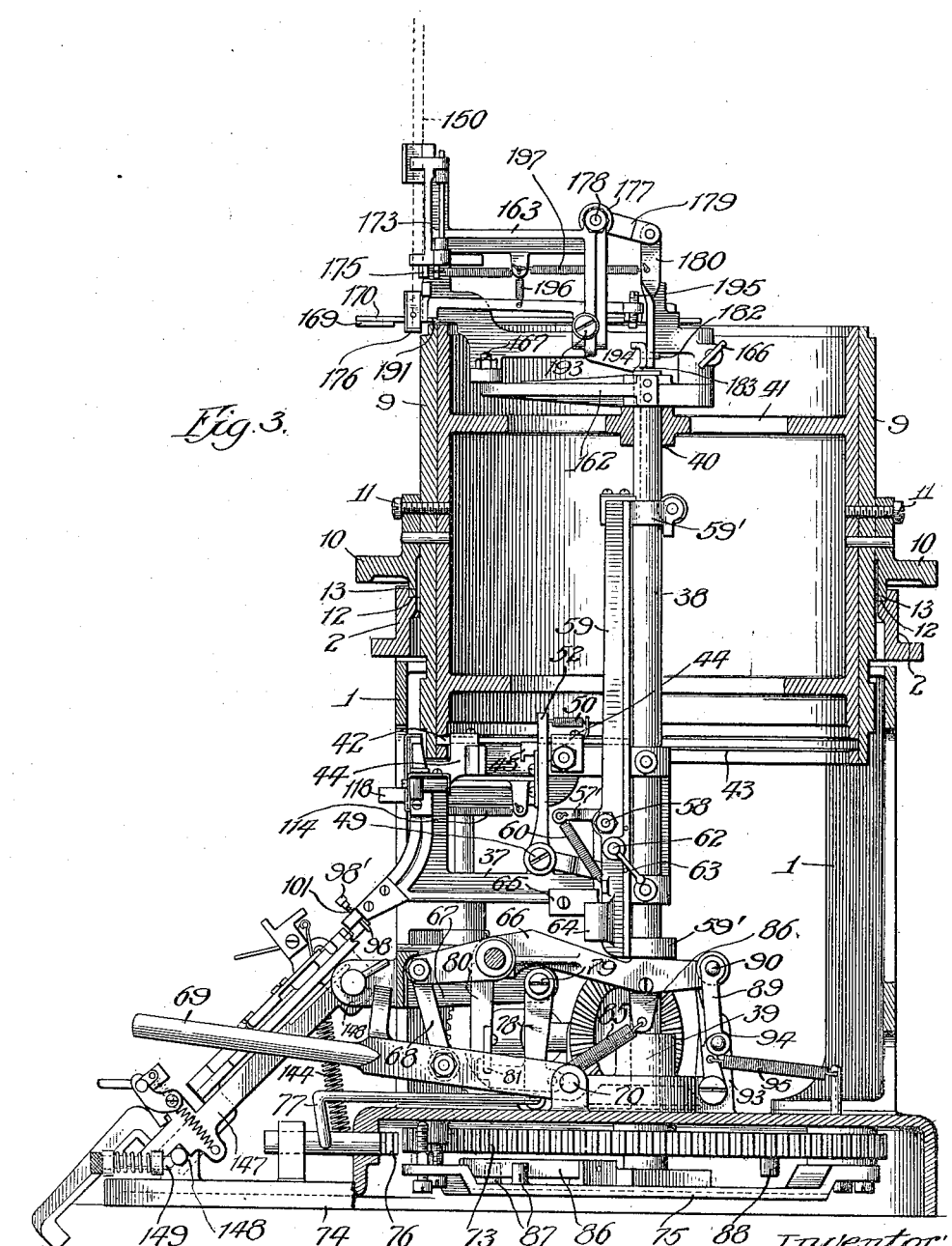
Figure 4:
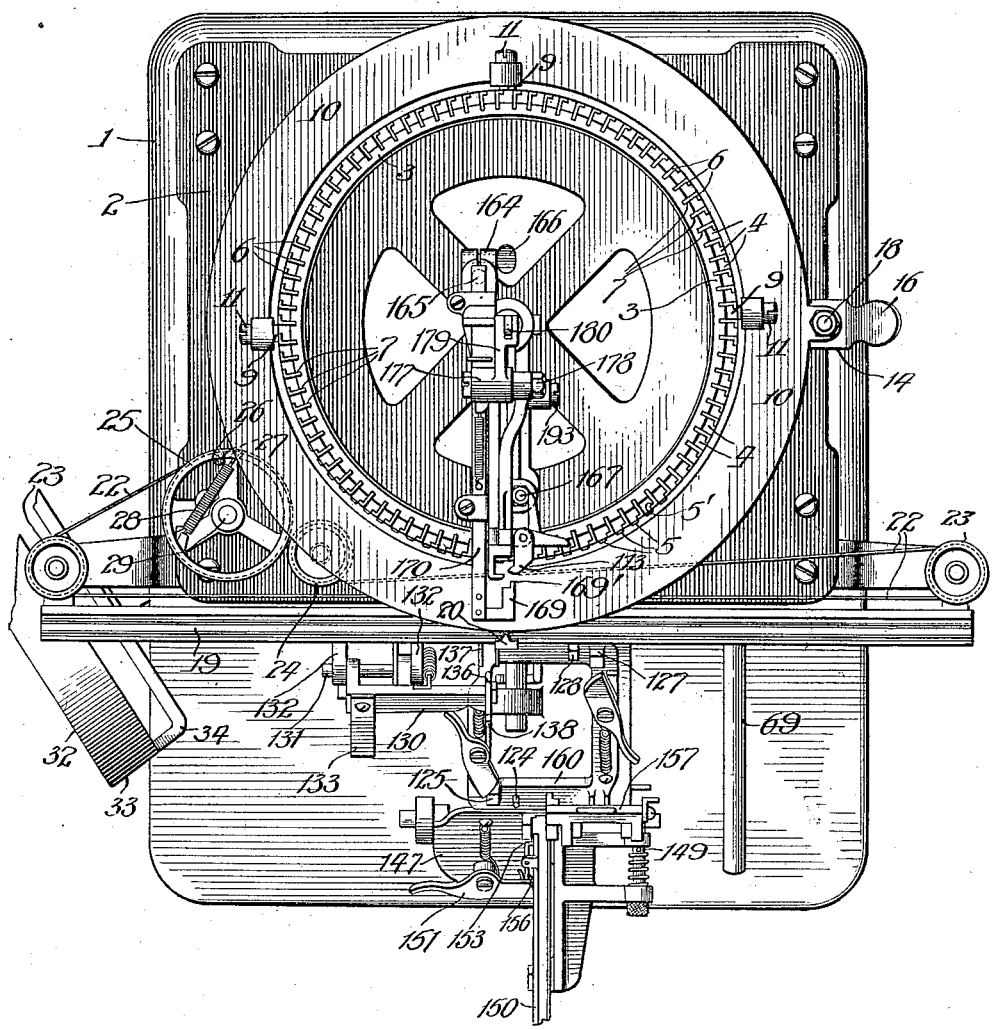

Figure 1 is a front view showing the setter, transfer and distributing mechanisms. Fig. 1ª is a fragmentary sectional view showing the device for locking the type cylinder. Fig. 2 is a side elevation with portions broken away to more clearly illustrate the distributing mechanism. Fig. 2ª is an enlarged fragmentary view showing the rock lever connections and the mechanism for opening the discharge chute. Fig. 3 is a vertical sectional view on the line 3—3 of Fig. 1. Fig. 4 is a plan view of the mechanism. Fig. 5 is a plan sectional view with the type cylinder removed. Fig. 6 is a bottom view. Fig. 7 is a view showing the setter mechanism. Fig. 7ª is an enlarged fragmentary sectional view on the line 7ª—7ª of Fig. 7. Fig. 8 is a view similar to Fig. 7 but showing the distributing mechanism. Fig. 9 is a view similar to Figs. 7 and 8 but taken from the opposite side of the machine. Fig. 10 is a fragmentary view of the distributing apparatus. Fig. 11 is a fragmentary view showing the manner of attaching the transfer holder to the distributing mechanism. Figs. 12 and 13 are fragmentary details of one end of the transfer holder showing the lock for holding the type. Fig. 14 is an enlarged fragmentary detail view showing the manner in which type may be removed during the setting operation. Fig. 15 is an enlarged fragmentary sectional view showing one type in section and the means for preventing displacement of said type. Fig. 16 is a fragmentary view showing the manner of holding the plate in position for transferring the type. Fig. 17 is a fragmentary plan view showing the plate in the position used in setting.

Referring to the drawings, the invention comprises a main frame 1 of suitable form having a top plate 2 adapted to support the various parts and mechanisms of the invention.

The type magazine is mounted in fixed position in the top plate of the main frame and it comprises a cylinder 3 having a plurality of holders 4 vertically arranged side by side on its periphery to contain type 5 in stacks, all the type in each holder bearing the same character. These type holders may be made integral with the cylinder, or in various forms separate therefrom, and fastened in proper position on the cylinder. In the form illustrated in the drawings L-shaped strips 6 are set in grooves 7 in the cylinder upon the bottom rim 8, and the type are made with an offset 5' to engage the flange of the strip, whereby the type are retained in place in the magazine. The flange terminates at 6' to permit the bottom type of the stack to be ejected forwardly.

A plurality of vertical bars 9 are spaced apart between adjacent type holders on the magazine and a supporting ring 10 surrounding the magazine is fastened to the cylinder by screws 11 passing through the bars. This ring is arranged to rest upon the top plate 2 of the main frame and the latter is recessed at 12 to receive the depending flange 13 of the ring. The magazine is mounted on the main frame so that it can be easily removed and replaced for any purpose, and it is adapted to be turned when set in position on the top plate of the main frame and registered properly and locked by a device 14 which is pivoted at 15 on the top plate 2 and has an operating handle 16 and a socket or recess 17 to engage a pin 18 on the ring. The parts are so constructed that when the locking device is engaged with this pin the magazine will not only be locked in fixed position but it is registered with the other parts of the machine.

An indicator bar 19 is supported on the main frame transversely of the magazine, approximately midway between the setting and distributing mechanisms, and the type are distributed in the type holders in the order in which the characters appear on the bar. A slide 20 is arranged to travel on the bar and it carries an indicator 21 which travels over the face of the bar. This slide is attached to a cord 22, or ribbon, which travels over pulleys 23 at the ends of the bar and over idle pulley 24 and around the grooved actuating pulley 25 to which the ends of the cord are attached. One end of the cord is preferably attached securely to the actuating pulley and the other end 26 is passed through an opening 27 in the periphery of said pulley and is attached to one end of a spring 28 located within the pulley and having its other end attached to the periphery of the pulley opposite said opening. This spring constitutes a yielding take-up or slack adjuster whereby the cord is constantly maintained taut.

The indicator cord actuating pulley 25 is mounted on a vertical shaft 29 supported in the main frame and this shaft is rotated by the setter shaft 30 through bevel gears 31. The setter shaft is set at an angle to the front of the machine and it carries an operating wheel 32 at the left of the front of the machine whereby the operator can manipulate the setter mechanism with his left hand. This wheel 32 is of peculiar and novel construction which particularly adapts it for the purpose intended. It comprises a rim 33 projecting forwardly from a spider 34 and a centrally located knob 35. The operator should grasp the wheel lightly and loosely, resting the palm of his hand, or his thumb and the base of the thumb, or merely his thumb on the rim and engaging the knob with his fingers. The construction is such that the operator may operate the wheel by a variety of movements, thus enabling him to relieve the strain on his thumb and thereby facilitating and improving the work. It will be found convenient to employ the thumb and palm on the rim for turning the wheel and the fingers on the knob as a brake to retard the movement of the wheel, whereby the operation is made more sensitive and the adjustment of the indicator and setter mechanism to proper position to receive a type from any one of the type holders in the magazine is accomplished with accuracy and rapidity. The wheel can be turned by the thumb alone, by the palm alone, by the thumb and palm, by the fingers alone, or by all in combination and with an arm movement, a wrist movement or finger movement, all of which is desirable to relieve the strain on the operator and make the operation less tiresome.

The setter mechanism comprises a frame 37 which is mounted on a main vertical shaft 38 and projects radially therefrom. This main shaft is mounted in a bearing 39 in the main frame and it projects upward centrally within the magazine and through an opening 40 in a spider 41 therein. The setter frame is located at the bottom of the magazine and it carries a slidable type ejector 42 which is adapted to be projected through a peripheral slot 43 in the magazine cylinder to engage and eject the lowest type in any type holder with which it has been registered in setting position. The ejector slides back and forth radially within the magazine in guides 44 on the setter frame and it has a block 45 on its under side between the guides to engage therewith to thereby limit the travel of the ejector. The block has a socket or recess 46 which receives a finger 47 on the bell-crank lever 48 pivotally mounted at 49 on the setter frame. When this bell crank is operated the ejector is caused to travel back and forth and the finger and socket engagement therebetween enables a lost motion of the bell crank, the ejector traveling in fixed limits between the guides. A spring 50 is attached to a post 51 preferably extending from one of the guides 44 fixed on the frame 37 at the rear or inner end of the ejector and to the upwardly projecting arm 52 of the bell crank lever to return the ejector to and normally hold it in retracted position. The other and horizontally projecting arm 53 of the bell crank lever carries a roller 54 which is arranged to engage and work in a pocket 55 formed between lugs 56 on the downwardly projecting arm of a bell crank tripper 57 when the machine is used for setting type. This tripper is pivotally mounted at 58 on a vertically and rotatively movable actuating bar 59 and a spring 60 is connected to the outer end of the horizontally projecting arm 57' of the tripper and to the setter frame to hold the tripper normally in position for setting. When the tripper is in the position shown in full lines in Fig. 7 the setting mechanism is operated but when the tripper is shifted to the position shown in broken lines the setter mechanism is thrown out of operation so that no setting will be done during the distributing operation. The tripper is shifted from setting to distributing position by a cam 61 which engages the downwardly projecting arm of the tripper and is mounted on an end of a shaft 62 which is operated by a handle 63. When the handle is in downward position, as shown in Fig. 9 the spring 60 holds the tripper in setting position, but when the handle is thrown up, as shown in this figure in broken lines, the cam will engage the downwardly projecting arm of the tripper, as shown in Fig. 8 and shift it to one side out of engagement with the roller 54.

The actuating bar 59 is mounted at its ends 59' loosely on the main shaft so that it may be moved vertically on said shaft and it is also engaged with the setter mechanism to move rotatively therewith and the main shaft 38. To enable this conjoint rotary movement of the actuating bar with the setter mechanism and main shaft and relative vertical movement of the actuating bar independent of the setter mechanism and main shaft I provide the actuating bar with a slotted guide 64 which engages a lug 65 on the setter mechanism. By this means the actuating bar is compelled to move rotatively with the setter mechanism and main shaft but is capable of a limited vertical movement on the main shaft relative thereto and to the setter mechanism.

The actuating bar is lifted by a lever 66 which is pivotally mounted in ears 67 on the main frame and is connected by a link 68 with the operating lever 69 pivoted at 70 on the base of the main frame. This lever 66 has two projections forming a recess 71 in which a peripheral flange 72 on the lower collar 59' is adapted to operate, whereby the lever may move the actuating bar vertically and the bar may rotate without affecting the lever.

The setter mechanism is properly registered with any type holder of the magazine by a toothed wheel 73 rigidly mounted on the main shaft beneath the bed plate 74 of the frame and above the cross bar 75 which is fastened to the bed plate and in which the main shaft is stepped. This register wheel (Figs. 3, 6) has teeth corresponding in number and location to the type holders in the magazine and a locking plunger 76 is operated simultaneously with the ejector to engage the register wheel and lock the setter mechanism in fixed position properly registered with the type holder from which a type is to be ejected. The plunger is supported on the main frame in radial alinement with the register wheel and is connected by a rod 77 with the lower free end of an arm 78 pivotally mounted at 79 on one of the ears 67 of the main frame. The lever 66 has an arm 80 projecting downward from its pivot and this arm has a finger 81 which is arranged to work in a notch 82 in the offset 83 on arm 78 and against a projection 84 adjacent said notch. A spring 85 is connected to the arm 78 and to an ear 86 on the lever 66. When the setter lever is in normal position at rest the finger 81 is engaged in notch 82 and the plunger is disengaged from the register wheel. When the setter lever is depressed to operate the actuating lever 66 and thereby lift the actuating bar, finger 81 rises out of notch 82 and at the same time spring 85 pulls on arm 78 which in turn actuates the rod 77 to throw the plunger into engagement with the register wheel. Finger 81 is permitted a sufficient lost motion over the offset 83 after rising out of the notch 82 to enable the parts to be constructed and timed so that the register wheel will be locked before the ejector has operated as it requires but a comparatively slight movement of the plunger to lock the register wheel and as it is desirable to effect this locking engagement to register the setter mechanism with the type holder of the magazine before the ejector moves forward sufficiently to engage a type.

The main shaft must be movable in substantially a complete circular orbit in order to utilize the full capacity of the magazine in both setting and distributing operations, but the setter mechanism must not pass a fixed point in either direction and for this purpose I provide a yielding stop to limit the movement of the main shaft in both directions. A flat spring or yielding strip 86 (Figs. 3, 6) is fixedly mounted at one end on the cross bar 75 and its free end projects between pins 87 which are spaced apart a sufficient distance to permit the free end of the spring stop to yield within the limits of the pins. The outer end of the yielding stop 86 is located in the path of a stud 88 arranged on the register wheel in a position to engage the yielding stop when the setter mechanism is registered with one of the bars 9, preferably that located at the back of the machine and marking the limit of movement of the setter mechanism in both directions. The yielding stop prevents shock or jar to the mechanism of the machine besides limiting the movement of the setter mechanism.

It is desirable to prevent a partial operation and to insure a complete operation of the machine, especially to avoid the partial ejection of a type from the magazine which might become jammed in the setter mechanism. For this purpose I provide an escapement of novel form comprising an arm 89 (Fig. 9) which is pivotally mounted at 90 on the actuating lever 66 and carries a side projection 91. A stepped or toothed bar 92 is mounted on one side of a post 93 in the path of operation of the projection 91 and an arm 94 projects upward in front of the bar 92 and is held normally against said bar by a spring 95. A spring 96 attached to the arm 89 and to the actuating lever 66 holds the projection 91 in down position at rest and in up position at the limit of its movement against the arm 94 and the projection is pitched at an angle so that on its upward movement it will travel over the stepped or toothed side of the bar and on its downward movement it will travel over the smooth front face of the bar. In the normal operation of the machine the projection 91 travels in an orbit around and in engagement with the bar 92, but if for any reason the setter lever is not depressed to its limit the projection 91 will lock in engagement with a step or tooth of the bar 92 and prevent the return of the setter mechanism to normal position until the partial operation has been continued to a complete operation. This avoids the possibility of a partial ejection of a type from the magazine which would interfere with the subsequent rotary adjustment of the setter mechanism and might jam or injure some of the parts.

The means just described absolutely insures complete operations of the machine whether or not any one operation is accomplished by an intermittent movement.

A type setter channel 97 upright at its upper part and curved forward at its lower part is provided on the setter frame to receive the type from the magazine until a line has been completed, whereupon the line is slid into a type holder of suitable form and supported as hereinafter described at the front of the machine and with which the setter channel is adapted to be registered. To hold the type in the setter channel while the line is being set therein I provide a stop in the form of a hooked pin 98, one end 99 of which projects upward through an opening 100 in the bottom of the setter channel and into the path of the type. The pin is held in this position normally by a spring 101 located between the setter frame and the head 98' of the pin so that a stop is always provided at or adjacent to the lower end of the setter channel to prevent the escape of type therefrom, and means are provided, as hereinafter described, for automatically engaging the head of the pin to depress it to leave the channel free so that the type may slide by gravity or be pushed out of the setter channel into the type holder.

The bottom of the setter channel 97 projects upward in front of the bottom rim 8 of the magazine and terminates preferably below the top of said rim over which the type are ejected (Fig. 9). One side wall of the setter channel projects upward at 102 above the bottom and opposite the lowest type in each type holder in the magazine and the other side wall of the setter channel terminates substantially flush with the top of rim 8 (Fig. 14). A spring actuated clamp 103 is pivotally mounted at 104 on the setter frame and it has a bent end 105 which projects over the low side wall of the setter channel across the channel and has a beveled edge. A spring 106 is located beneath the handle 107 of this clamp to hold it normally in position with the beveled edge of the bent end across the setter channel (Fig. 1). When the type is pushed out of the magazine holder by the ejector it enters the setter channel at the top thereof between the upper end 102 of one side wall and the beveled or inclined edge of the clamp 103. This clamp will yield sufficiently to admit the type and it will hold the type suspended temporarily at the top of the setter channel.

A pusher 108 is mounted on a movable frame 109 which is pivoted at 110 on an arm 111 pivoted at 112 on the setter frame (Figs. 7, 8, 9). A spring 113 attached to arm 111 and to the setter frame holds the arm normally in elevated position and a spring 114 attached to the pusher frame and to the pusher arm 111 holds this frame with the pusher normally in its elevated position above the clamp and over the upper end of the setter channel (Figs. 1, 2, 3, and 8). A lug 115 on the pusher frame is arranged to engage a pin 116 on the clamp. An adjustable screw 117 on the tripper is arranged to engage the rear end of the pusher arm to depress the forward end carrying the pusher at or about the limit of the downward movement of the setter lever to cause the pusher to engage the type which has been ejected from the magazine and is held at the upper end of the setter channel between the wall 102 and the clamp and disengage it therefrom and push it down into the channel. If for any reason a type should become jammed at the ejecting point, or if it is desired to remove a type from the setter channel, the pusher frame can be swung outward on its pivot by operating the handle 118 on said frame thereby causing the lug 115 to engage the pin 116 and swing the clamp out of its normal position at the top of the setter channel, thus leaving the setter channel clear at its upper end. A projection 119 may be provided on the setter frame to be engaged by the fingers when the operator presses upon the handle 118 of the pusher frame to facilitate the operation. These devices provide in a simple way for receiving and holding the type temporarily at the upper end of the setter channel after it has been ejected from the magazine and for disengaging and pushing the type down in the channel away from the setting point at the upper end of the setter channel at the end of the setting operation, and the devices are so constructed and mounted on the setter frame that they can be independently or conjointly operated manually, without affecting their automatic operation, to clear the upper end of the type channel for any desired purpose. It will be observed that the lug 115 does not engage the pin 116 of the clamp until the pusher has been swung outward sufficiently to clear the channel and that the clamp can be operated without affecting the pusher, so that the pusher and clamp are capable of manual operation conjointly or independently.

A type holder 120 of suitable construction capable of receiving one or more lines of type is supported in an adjustable frame 121 at the front of the machine and in a position so that any of its type grooves may be alined with the setter channel in order that the line of type in the channel may slide into the groove. The holder frame is slidably mounted on rods 122, 123 both rotatably supported in ears 122' and 123' on the main frame. The grooves of the holder are closed at one end by stops 120' and open at the other end and during the setting operation the holder is arranged in the frame with the open end uppermost to receive the type from the setter mechanism, but in the distributing operation the holder is arranged in the frame with the open end down so that the type may slide into the transfer holder. For the setting operation the type holder is supported on a pin 124 and is held against lugs 125 on the holder frame by a spring clamp 126 pivotally mounted on the holder frame and arranged to engage one edge of the holder. In the distributing operation the holder is arranged in the frame against the stops 127 and beneath gage stop 128 by a spring actuated clamp 129 pivotally mounted on the holder frame and adapted to engage one edge of the holder.

To lock the setter mechanism and the type holder frame against movement when the setter channel and a groove in the type holder have been registered in approximately alined position and to perfect this registration and also to shift the type holder frame to move the type holder up close against the setter channel, I provide a rock lever 130 which is pivotally mounted on a pin 131 in ears 132 on the main frame and is operated by handle 133. The rock lever carries a lug 134 which is adapted to enter the socket 135 in the type holder frame, or in one of the grooves therein, according to the lateral adjustment of said frame, a lug 136 to enter a guide socket 137 in the setter frame and a lug 138 to engage the head 98' of the hooked stop pin 98. When these lugs are engaged with the respective parts just named the setter mechanism and the type holder frame will be held and locked with the setter channel in correct registration with a groove in the type holder and the stop pin will be depressed so that the type may slide freely by gravity out of the setter channel into the type groove of the holder. In order that the setter mechanism may be swung freely in its circular orbit without liability of engaging the type holder or its frame I provide for supporting the holder and its frame in a position slightly below its position when registered to receive type from the setter channel. To this end the rod 122 with which the holder frame is engaged is mounted in eccentric bearings in the ears 122' and the holder has a fork 121' to engage the rod 123 so that the holder frame is capable of a lengthwise adjustment when the rod 122 is turned which is independent and unaffected by its free lateral adjustment when not locked as herein described. The rod 122 has an arm 138' carrying a pin 139 which operates in the slot 140 of a lever 141 which is pivotally mounted at 142 on the rock device 130. A spring 143 is attached to pin 139 and to the lever 141 to rock rod 122 when the rock device is thrown to locked position and the slot 140 enables the rock device to continue its movement, after the rod 122 has come to rest, by reason of the holder frame engaging the setter frame at the lower end of the setter channel. In this position of the holder frame the holder abuts snugly against the setter frame to provide a practically continuous and unbroken passage for the type from the setter channel to the type holder. A spring 144 is attached to the rock device and to the base of the main frame and it holds the rock device in either of its adjusted positions. The rod 122 also carries a pin 145 which engages a projection 146 on the setter lever (Fig. 5) to depress said lever and throw the plunger into engagement with the register wheel when the rock device just described is operated to lock the setter mechanism and the holder frame. Thus the machine embodies several automatic locking devices for holding the parts in fixed position while the type are moving from the setter channel into the type holder. When the rock device is swung outward to normal position these locking devices are released and all the parts restored automatically to normal position. The holder frame may be adjusted laterally by hand to bring successive grooves of the type holder into position to receive type from the setter channel.

To adapt the machine for distributing type I provide a transfer frame 147 which is mounted on the rods 122 and 123 so that it will not interfere with or be affected by the operation of the holder frame. While this transfer frame may be permanently mounted on the machine, I prefer to make it removable so that it can be taken off during the setting operation if desired. To this end it is provided with sockets 148 to engage the supporting rods 122, 123 and it carries a spring plunger locking device 149 to engage rod 123, whereby to secure the transfer frame in place on the main frame.

For the distributing operation I first load a transfer holder 150 with type and then mount this holder on the distributing mechanism. The transfer holder is secured in place on the transfer frame by a spring actuated clamping device 151 and in alinement with a short channel 152 on the transfer frame which is registered with the transfer holder groove when the latter is secured in place. The transfer holder is closed at one end, which is the lower end when the holder is arranged in the transfer frame and the upper end when arranged in the distributing mechanism, and it has a spring stop 153 projecting through one side wall into the groove of said holder. This stop is carried on one end of a lever 154 pivotally mounted on the holder at 155. The other end of the lever is the handle thereof and a spring 156 operates thereon to hold the stop normally in the groove. The clamping device 151 has a lug to engage and depress the handle end of the lever 154 and withdraw the stop from the groove when said device is operated to clamp the transfer holder in the transfer frame, thereby automatically clearing the transfer holder groove of the obstruction normally afforded by the stop. When the transfer holder is removed from the transfer frame and loaded with type the stop is automatically returned to position in the groove to prevent the accidental escape of the type.

The holder frame is locked in position with a holder groove registered with the transfer holder groove by a rock device 157 pivotally mounted at 158 on the transfer frame and held in locked or unlocked positions by spring 159. This locking device has a lug 160 which is adapted to engage a socket 161 in the lower lug 127 or any of the grooves in the type holder whereby to register and lock the holder frame in position for the transfer of type.

The distributing mechanism is mounted on a support 162 which is fixed on the upper end of the main shaft (Figs. 2, 8, 10) and it comprises a frame 163 having a split socket 164 to receive a pin 165 on the support. A thumb screw 166 is provided to lock the socket members on the pin so that the distributing mechanism will turn with the main shaft. A pin 167 engages an opening 168 in the end of the support to register the mechanism in proper radial position within the magazine. A distributer or ejector 169 is carried by a bar 170 mounted to slide in the frame 163. This distributer is arranged to operate on the face of the type in the transfer holder and push them back through an opening 171 in the holder and into the type holder of the magazine with which the distributer is registered. The distributer has a prong 169' to engage the offset 5' of the type in the distributing operation so as to make the movement of the type even and to avoid twisting. The transfer holder is clamped in upright position on the distributing frame, with the end carrying the stop 153 down, by a clamping device 173 which is held normally in closed position by a spring 174 and is provided with a lug 175 to engage the stop lever 154 and operate the same when the clamp engages the transfer holder to withdraw the stop from the transfer holder groove. The transfer holder stands on a lip 176 on the distributing frame and the stack of type in the holder will stand on this lip when released by the withdrawal of the stop. The distributer travels over the lip to push the bottom type in the stack into the magazine. A bell crank lever 177 is pivoted at 178 on the distributer frame and one arm 179 is pivotally connected to the upper end of a link 180 which is provided at its lower end with an opening 181 to engage a pin 182 on the upper end of a bar 183 rigid with and projecting up from the bar 59 (Fig. 3). The other arm 184 of the bell crank lever is connected by a spring 185 with the distributer slide (Fig. 8) and it has a finger 186 which engages a socket 187 in a block 188 on said slide. The slide travels in guides 189 on the distributer frame and the block engages a stop 190 on the frame to limit the distributing movement of the distributer. A pusher 191 carried by a lever 192 pivoted at 193 on the distributer frame is arranged to engage and push the type down into the magazine holder after it has been pushed out of the transfer holder by the distributer. This pusher lever is operated by a lip 194 on the bar 183 and the pusher lever carries an adjusting screw 195 to engage the lip so that the movement may be regulated as required. A spring 196 returns the pusher lever to normal position and a spring 197 is attached to the distributer frame and the link 180 to hold the link in engagement with the pin 181. The distributer must complete the ejection of the type from the transfer holder before the pusher operates and this is enabled by the socket 187 which permits the finger to continue its movement after the block has engaged stop 190.

The distributing mechanism may remain in place on the machine when not in use or it may be removed. During the setting operation the link 180 should be disengaged from bar 183 to throw the distributer out of operation, and during the distributing operation the setting ejector should be thrown out of operation by shifting the tripper as before explained.

I prefer to employ type 5 (Fig. 7ª) with a recess 198 open on one side and at the bottom, a partition 199 and an offset 5', and these type are stacked with the open side of the recess down. The type are very small in size and liable to become easily disarranged unless handled properly. As a further precaution against improper delivery of the type at the ejecting point I prefer to provide a projection 8' (Fig. 15) on the bottom rim of the magazine at the bottom of each magazine holder which fits in the recess of the bottom type. Thus when the type are ejected from the magazine holder this projection in coöperation with the recess will assist in causing the type to move radially outward and without tilting or twisting. This projection also prevents the type from sliding back through the opening and into the cylinder.

My invention provides a compact machine of comparatively simple construction for doing this class of work, and it can be readily understood and easily operated by unskilled persons after very short trial. It is automatic in many respects and particularly in locking certain parts while others are being operated, which is very important with machines intended for universal use. The operations of the various groups of mechanisms have been described and need not be repeated.

What I claim and desire to secure by Letters Patent is:

1. The combination of a stationary cylindrical magazine carrying a plurality of stacks of type on its periphery, ejector mechanism mounted to revolve adjacent to one end of said magazine and comprising an ejector located within the circle of type carried by said magazine, and independent means for rotating and for actuating said ejector to discharge a type radially outward from the magazine.

2. The combination of a magazine having a plurality of stacks of type on its periphery, ejector mechanism at one end of the magazine and comprising an ejector mounted to rotate within the circle of type on the magazine and to slide radially to discharge a type outward from the magazine, and independent means for rotating and sliding said ejector.

3. The combination of a stationary cylindrical magazine having a plurality of stacks of type on its periphery, an ejector rotatably mounted within the circle of the magazine and adapted to be registered with any one of the stacks of type, and independent means for rotating said ejector and for sliding it to push a type radially outward from the stack with which it is registered.

4. The combination of a stationary cylindrical magazine having a plurality of stacks of type on its periphery, an ejector mounted within said magazine and adapted to rotate on the axial center thereof to be registered with any one of said stacks and to slide radially within the circle of said type to eject a type radially outward from the stack with which it is registered and independent means for rotating and for sliding said ejector.

5. The combination of a stationary cylindrical magazine mounted endwise and having a bottom rim to support a plurality of stacks of type on the periphery of the magazine and also having an opening back of the bottom type in each stack, an ejector mounted within said magazine and adapted to rotate on the axial center thereof and adapted to be registered with any of said bottom type and to slide radially through the opening to eject the bottom type with which it is registered radially outward from the magazine, and independent means for rotating and for sliding said ejector.

6. The combination of a magazine carrying a plurality of stacks of type on its periphery, an ejector arranged to engage the base of the bottom type in any one of said stacks, means for rotating said ejector on the axial center of the magazine to register it with any one of said stacks, and independent means for operating said ejector radially of the magazine to discharge a type outward therefrom.

7. The combination of a stationary cylindrical magazine having a plurality of stacks of type on its periphery, a type channel located in front of the magazine and outside said periphery and mounted to rotate on the axial center of said magazine, an ejector located within the circle of type in the magazine, and independent means for rotating and for operating said ejector to discharge a type radially outward from the magazine into said channel.

8. The combination of a stationary cylindrical magazine having a plurality of stacks of type on its periphery, a type channel located outside the perimeter of the magazine and mounted to rotate on the axial center of said magazine and having one end arranged to be registered with the end type in any one of the stacks, an ejector slidable radially within the magazine to engage the end type in the stack with which it is registered to eject the same radially outward from said magazine into said channel, and independent means for rotating and for sliding said ejector.

9. The combination of a stationary cylindrical magazine carrying a supply of type on its periphery with the type faces projecting radially outwardly, a type channel mounted to rotate on the axial center of the magazine and having its receiving end located outside the perimeter of the magazine to receive type from the magazine, an ejector mounted to rotate conjointly with said channel and independently slidable within the magazine and radially thereof to engage a type and discharge it radially outward from the magazine into the channel, and independent means for rotating and for sliding said ejector.

10. The combination of a magazine having a supply of type on its periphery each type being provided with a recess, a type channel adapted to receive type from the magazine, means for ejecting type from the magazine into the channel, and means including a stationary projection engaging in a recess in the type and a movable clamp for guiding the type in its movement from the magazine into the channel.

11. The combination of a magazine provided with a plurality of type channels on its periphery, a type-setter, a channel adapted to receive type from the channels of the magazine, and a projection on the magazine at the lower end of each of the magazine channels for guiding the type in its movement from the magazine into said setter channel.

12. The combination of a magazine carrying a supply of type on its periphery, a channel adapted to receive type from the magazine, and spring-controlled means on the channel movable transversely thereof for guiding the type in its movement from the magazine into the channel.

13. The combination of a magazine carrying a supply of type on its periphery, a channel adapted to receive type from the magazine, a projection on the magazine, and spring controlled means on the channel cooperating with said projection to guide the type in its movement from the magazine into the channel.

14. The combination of a magazine carrying a supply of type on its periphery, a channel adapted to receive type from the magazine, spring pressed means pivoted on said channel and movable relatively to the channel for receiving and guiding and temporarily sustaining the type in the position to which it is discharged from the magazine into the channel, and means for disengaging the type from said sustaining means.

15. The combination of a type holder adapted to contain a plurality of type, each having a guide recess in one side thereof, said type holder being provided at one end with a stop to retain the type in the holder, a projection on said stop to engage the recess of the adjacent type, and means for ejecting the type from the type holder.

16. The combination of a magazine to hold a stack of type, each having a guide recess in one side thereof, said magazine having a stop thereon to engage said type, a projection on the stop to engage the recess in the adjacent type, and means for ejecting said type from the magazine.

17. The combination of a magazine adapted to hold a stack of type, each of said type being provided with a guide recess in one side thereof, a stop on said magazine to sustain said stack, a guide projection on said stop to engage the recess in the adjacent type, and means for ejecting said adjacent type from the magazine.

18. The combination of a magazine having a plurality of type holders, arranged side by side on its periphery, to receive stacks of type, each type having a guide recess in one side thereof, said magazine being provided with a rim at one end to sustain said stacks, means for ejecting the bottom type from any one of said stacks radially from the magazine, and a projection on said rim to engage the recess in the bottom type and guide it while being ejected from the magazine.

19. The combination of a magazine for holding a stack of type provided with a rim adapted to support said stack and an opening above said rim to admit an ejector, each of said type having a guide recess therein upon one side and at the bottom thereof, and a projection on said rim to engage said recess of the bottom type to prevent said type from slipping outward through said opening and also to guide the type while being ejected.

20. The combination of a magazine carrying a supply of type on its periphery, a setter channel, means for ejecting type from the magazine into said channel, and clamping means including a member movable relatively to the channel for engaging the type as it is ejected from the magazine and sustaining it in the channel.

21. The combination of a magazine carrying a supply of type on its periphery, a setter channel, means for ejecting type from the magazine into said channel, clamping means including a pivotally mounted member for receiving and sustaining the type in the channel as it is ejected from the magazine, and means for engaging the type to release it from said clamping means.

22. The combination of a magazine carrying a supply of type on its periphery, a type channel having one side wall extended above the other, means for ejecting a type from the magazine into said channel, and a device for clamping the type between itself and said extended wall as the type is ejected from the magazine into the channel.

23. The combination of a magazine carrying a supply of type on its periphery, a type channel having one side wall extended above the other, means for ejecting a type from the magazine into said channel, a device for clamping the type between itself and said extended wall as the type is ejected from the magazine into the channel, and means for releasing the type.

24. The combination of a magazine carrying a supply of type on its periphery, a channel to receive type from said magazine, means for ejecting type from the magazine into the channel, and a yielding clamping device movable relatively to the channel walls to engage the type as it is ejected from the magazine.

25. The combination of a magazine carrying a supply of type on its periphery, a channel to receive type from said magazine, means for ejecting type from the magazine into the channel, and a clamping device pivotally mounted on the channel to engage the type as it is ejected from the magazine.

26. The combination of a magazine carrying a supply of type on its periphery, a channel to receive type from said magazine, means for ejecting type from the magazine into the channel, and a yielding clamping device pivotally mounted on the channel to engage the type as it is ejected from the magazine.

27. The combination of a magazine carrying a supply of type on its periphery, a channel to receive type from the magazine, means for ejecting type from the magazine into the channel, a yielding clamp movable with respect to the channel walls for sustaining the type in the channel as it is ejected from the magazine, and a pivotally mounted pusher arranged above the channel and adapted to engage the sustained type and release it from said sustaining means.

28. The combination of a magazine carrying a supply of type on its periphery, a channel to receive type from the magazine, means for ejecting type from the magazine into the channel, clamping means for yieldingly sustaining the type in the channel as it is ejected from the magazine, a pusher arm pivotally mounted to operate in the direction of the length of said channel, and a pusher carried by said arm above the channel and adapted to engage the sustained type and release it from said sustaining means, said pusher being also movable transversely of the channel.

29. The combination of a magazine carrying a supply of type on its periphery, a channel to receive type from the magazine, means for ejecting type from the magazine into the channel, means for sustaining the type in the channel as it is ejected from the magazine, and a pusher mounted to operate in the direction of the length of said channel and adapted to be swung laterally away from said channel to release the type from said sustaining means.

30. The combination of a magazine carrying a supply of type on its periphery, a channel to receive type from the magazine, means for ejecting type from the magazine into the channel, yielding means for sustaining the type in the channel as it is ejected from the magazine, and a yieldingly and movably mounted pusher arranged above and adapted to engage the type held by said sustaining means to release the type therefrom, said pusher being movable into inoperative position relatively to the channel.

31. The combination of a magazine carrying a supply of type on its periphery, a type channel to receive the type from said magazine, means for ejecting the type from the magazine, a yielding clamping device to engage the type as it is ejected from the magazine, a yielding pusher adapted to engage the type while it is engaged by the clamping device, and means for moving said clamping device and pusher out of their engaging positions.

32. The combination of a magazine having a plurality of stacks of type on its periphery, an ejector rotatable on the axial center of the magazine and movable radially of the magazine for ejecting type therefrom, means including a register wheel and a locking finger for locking the ejector against rotary movement during its radial movement, and a pivotal lever for actuating said ejector and locking means.

33. The combination of a magazine having a plurality of stacks of type on its periphery, an ejector rotatable on the axial center of the magazine and movable radially of the magazine for ejecting type therefrom, a register wheel rotatable conjointly with the ejector, a locking plunger to engage the register wheel, and a pivotally mounted operating lever for operating both said ejector and plunger.

34. The combination of a magazine having a plurality of stacks of type on its periphery, an ejector rotatable on the axial center of the magazine and movable radially of the magazine for ejecting type therefrom, a register wheel rotatable conjointly with the ejector, a yielding stop, and a pin on the register wheel to engage the stop to limit the rotary movement of the ejector in both directions.

35. The combination of a magazine having a plurality of stacks of type on its periphery, a rotatably mounted type channel to receive type from the magazine, a type holder to receive type from the channel, and means for adjusting said type holder toward or away from said channel.

36. The combination of a magazine having a plurality of stacks of type on its periphery, a rotatably mounted type channel to receive type from the magazine, a type holder movable tangentially to the orbit of movement of the channel to receive type therefrom.

37. The combination of a magazine having a plurality of stacks of type on its periphery, a rotatably mounted type channel to receive type from the magazine, a type holder movable tangentially to the orbit of movement of the channel and toward or away from the channel to receive type therefrom.

38. The combination of a magazine having a plurality of stacks of type on its periphery, a rotatably mounted type channel to receive type from the magazine, a type holder frame, means for securing a type holder on the frame, means for adjusting said holder toward and from the channel, and means for registering the type holder and channel laterally.

39. The combination of a magazine having a plurality of stacks of type on its periphery, a rotatably mounted type channel to receive type from the magazine, a type holder frame, means for securing a type holder on the frame, and means for shifting the holder frame to register the type holder against and with the channel.

40. The combination of a magazine having a plurality of stacks of type on its periphery, a rotatably mounted type channel to receive type from the magazine, a type holder frame, means for securing a type holder on the frame, and means for registering the type holder and channel laterally and against each other.

41. The combination of a magazine having a plurality of stacks of type on its periphery, a rotatably mounted type channel to receive type from the magazine, a type holder frame, means for securing a type holder on the frame, and means for simultaneously registering the type holder and channel laterally and against each other.

42. The combination of a stationary cylindrical magazine having a plurality of stacks of type on its periphery, a rotatably mounted type channel, means for automatically locking the channel relatively to the magazine to receive type from the magazine, a type holder, and means for registering said channel and type holder in discharge position.

43. The combination of a magazine having a plurality of stacks of type on its periphery, a rotatably mounted type channel to receive type from the magazine, a type holder, and means for registering and locking said channel and type holder together in discharge position.

44. The combination of a magazine having a plurality of stacks of type on its periphery, a rotatably mounted type channel to receive type from the magazine, a type holder, and a rock device to engage with and register said channel and type holder and lock said channel in discharge position.

45. The combination of a magazine having a plurality of stacks of type on its periphery, a rotatably mounted type channel to receive type from the magazine, a movable stop sustaining the type in said channel, and means including a plurality of lugs for registering the channel in discharge position and a device for withdrawing said stop.

46. The combination of a magazine having a plurality of stacks of type on its periphery, a rotatably mounted type channel to receive type from the magazine, a type holder at one end of the channel, a movable stop sustaining the type at the other end of said channel, and means for registering and locking the channel and for withdrawing said stop.

47. The combination of a magazine having a plurality of stacks of type on its periphery, a rotatably mounted type channel to receive type from the magazine, a type holder frame, a type holder on said frame, and means disconnected when in inoperative position from both the channel and holder for registering the channel and type holder and for locking them together.

48. The combination of a magazine having a plurality of stacks of type on its periphery, a rotatably mounted type channel to receive type from the magazine, a type holder frame, a type holder on said frame, and means for registering the channel and type holder laterally and against each other and for locking them together.

49. The combination of a magazine having a plurality of stacks of type on its periphery, a rotatably mounted type channel to receive type from the magazine, a type holder frame, a type holder on said frame, a movable stop to sustain the type in said channel, and means immovable with the frame or channel for registering and locking the channel and type holder and for withdrawing said stop.

50. The combination of a magazine having a plurality of stacks of type on its periphery, a rotatably mounted type channel to receive type from the magazine, a type holder frame, a type holder on said frame, and a stationarily mounted rock device adapted to engage and register and lock said channel and type holder.

51. The combination of a stationary machine frame, a magazine having a plurality of stacks of type on its periphery, a rotatably mounted type channel to receive type from the magazine, a type holder frame, a type holder on said frame, a movable stop to sustain the type in said channel, and a rock device carried by said machine frame and adapted to engage and register and lock said channel and type holder and withdraw said stop.

52. The combination of a magazine having a plurality of stacks of type on its periphery, a rotatably mounted type channel to receive type from the magazine, a type holder frame, a type holder on said frame, guides on the channel and holder frame, and a rock device mounted independently of the channel and holder frame having lugs to engage said guides and register and lock the channel and holder.

53. The combination of a magazine having a plurality of stacks of type on its periphery, a rotatably mounted type channel to receive type from the magazine, a type holder frame, a type holder on said frame, a register wheel mounted to rotate with the channel, and means for engaging said wheel to register and lock the channel.

54. The combination of a magazine having a plurality of stacks of type on its periphery, a rotatably mounted type channel to receive type from the magazine, a register wheel mounted to rotate with the channel, a plunger to lock said wheel, and means for operating said plunger to lock the channel against rotary movement.

55. The combination of a stationary cylindrical magazine provided on its periphery with a plurality of stacks of type, an ejector rotatable about the longitudinal axis of said magazine so as to register with any one of the stacks of type carried by said magazine, means for rotating said ejector, and independent means for sliding said ejector radially of the magazine to engage the inner end of the lower type in one of said stacks and eject the same radially outward from the magazine.

JOSEPH S. DUNCAN.

Witnesses:
M. A. KIDDIE,
GEO. C. DAVISON.

Copies of this patent may be obtained for five cents each, by addressing the "Commissioner of Patents, Washington, D. C."